United States Patent [19]

Cherukuri

[11] Patent Number: 5,082,671

[45] Date of Patent: Jan. 21, 1992

[54] LOW MOISTURE SUCRALOSE SWEETENED CHEWING GUM

[75] Inventor: Subraman R. Cherukuri, Towaco, N.J.

[73] Assignee: Warner-Lambert Company, Morris Plains, N.J.

[21] Appl. No.: 630,096

[22] Filed: Dec. 19, 1990

Related U.S. Application Data

[63] Continuation-in-part of Ser. No. 427,663, Oct. 27, 1989.

[51] Int. Cl.$^5$ ............................................. A23G 3/30
[52] U.S. Cl. ..................................... 426/3; 426/658; 426/804; 426/548
[58] Field of Search ........................................ 426/3-6, 426/548, 658, 804

[56] References Cited

U.S. PATENT DOCUMENTS

| | | | |
|---|---|---|---|
| 3,262,784 | 7/1966 | Bucher | 426/5 |
| 3,492,131 | 1/1970 | Schlatter | 426/548 |
| 4,035,572 | 7/1977 | Stubits et al. | 426/3 |
| 4,150,161 | 4/1979 | Rudolph et al. | 426/3 |
| 4,435,440 | 3/1984 | Hough et al. | 426/658 |
| 4,549,013 | 10/1985 | Hough et al. | 426/658 |

FOREIGN PATENT DOCUMENTS 8808672 11/1988 World Int. Prop. O. ............. 426/5

Primary Examiner—Jeanette Hunter
Attorney, Agent, or Firm—Craig M. Bell

[57] ABSTRACT

A low moisture sucralose sweetened chewing gum composition having a moisture content below about 2% by weight, wherein sucralose is released from the composition at a rate of 15 to 50 sucrose equivalents per minute within the initial 30 seconds of chewing, and at a rate of more than 6 sucrose equivalents per minute at about 5 minutes of chewing.

26 Claims, 2 Drawing Sheets

LOW MOISTURE SUCRALOSE SWEETENED CHEWING GUM

RELATED APPLICATION INFORMATION

This application is a continuation-in-part of U.S. Ser. No. 07/427,663, filed Oct. 27, 1989, now pending, the entire disclosure of which is incorporated herein by reference.

BACKGROUND OF THE INVENTION

1. Field of the Invention

The present invention relates to a novel chewing gum composition and in particular to a low moisture sucralose sweetened chewing gum composition having a moisture content below about 2% by weight of the final composition wherein said composition contains a chewing gum base, and a bulking agent comprising at least one bulk sweetener and a viscous liquid. The present invention also relates to a process for preparing the chewing gum composition of the present invention.

2. Description of Related Art:

Chewing gums and bubble gums have been prepared in the past with the purpose in mind of extending shelf life, increasing initial flavor and sweetener intensity and prolonging long lasting sweetness and flavor without bitterness being developed. With regard to shelf stability, gums prepared and stored, even at room temperature, for extended periods of time tend to lose their moisture and elasticity, with the result that they become brittle, and initially crumble when they are placed in the mouth. This problem is particularly noticeable in the instance of sugarless gums, and particularly those gums that are stored in a dry atmosphere, for example atmospheres having less than about 50 to 60% relative humidity.

Sugarless gums conventionally contain on the order of at least about 5% by weight of water; and it is therefore theorized that brittleness or the phenomenon of staling results from the loss of that water, due to evaporation or otherwise over time. Specifically, sugarless gums contain large amounts of sorbitol which serves conventionally as a sweetener as well as a bulking aid. Sorbitol is known for its tendency to recrystallize in the presence of even small amounts of water and its tendency to crystallize when the water in which it is dissolved is removed. It is therefore theorized that as the water containing the sorbitol in the gum composition is lost by evaporation or otherwise, the sorbitol crystallizes and thus promotes the embrittlement of the gum composition that contributes to the staling phenomenon.

In addition, the prior art has disclosed chewing gum compositions which have low percentages of moisture in the final product. For the most part, the prior art has concentrated on driving off the water once the chewing gum formulation has been made. Thus the prior art compositions ordinarily contain water and/or moisture containing ingredients, e.g., sorbitol solutions, corn syrups solutions and so forth, and would therefore require heating or purification of the composition to drive off water and obtain a certain moisture content.

In this regard, U.S. Pat. No. 4,035,572 discloses a gum base formulation with less than about 0.5% moisture. This low percentage of moisture is due to the purification process which removes water and solvent from the gum base. U.S. Pat. No. 4,382,963 involves a low calorie chewing gum which uses polydextrose as the sole soluble bulking agent. The moisture content in the final product is about 1 to 5% and thus is obtained by omitting the aqueous component, namely sorbitol, syrups or corn syrup solids, which are normally used in chewing gum products.

U.S. Pat. No. 3,262,784 concerns a chewing gum composition which has less than 1% moisture in the final product, due to heating between about 170° and 250° F to drive off the water. 20 U.S. Pat. No. 4,150,161 concerns a two-component confectionery formulation having a carbonated candy component and a pliable bubble gum component, with each component having a controlled water activity between 0.1 and 0.3 and which is capable of surviving long periods of storage when packaged in a moisture-resistant material.

U.S. Pat. No. 4,514,422 to YANG et al. discloses a substantially anhydrous chewing gum composition which is useful in the chewing gum formulations of this invention. These formulations contain a gum base, sugar alcohol and glycerin in amounts greater than 10% to about 18%, with disclosed amounts above 8% being usable. The disclosure of this reference is incorporated herein by reference.

The prior art chewing gum formulations have been used in combination with both natural and artificial sweeteners. Intense artificial sweeteners that have been disclosed for use in chewing gum formulations include the water-soluble artificial sweeteners, such as soluble saccharin salts such as sodium or calcium saccharin, cyclamate salts, acesulfame-K and the like and the free acid form of saccharin. In addition, dipeptide based sweeteners such as L-aspartyl-L-phenylalanine methyl ester and materials described in U.S. Pat. No. 3,492,131 and the like have also been described.

In addition to these artificial sweeteners, another artificial sweetener, namely sucralose, has been recently described in U.S. Pat. 4,380,476, along with its use in ingestible products as described in U.S. Pat. Nos. 4,549,013 and 4,435,440. Sucralose is reported to be 600 to 650 times as sweet as sucrose and has the chemical name 4-1,-6,-trichlorogalactosucrose, and has been abbreviated as a chloro-derivative of sucrose. This particular sweetener is a high intensity artificial sweetener, since it is many times more sweet than sucrose itself, similar to saccharin which is about 300 times as sweet as sucrose, aspartame which is about 200 times as sweet as sucrose, and acesulfame-K which is about 200 times as sweet as sucrose.

Several limitations have existed in chewing gum formulations which relate to the rate at which the sweetener is released from the chewing gum composition when it is being chewed. Such release normally occurs in both sugar and non-sugar sweetened chewing gum formulations within times of from 5 to 7 minutes upon commencement of chewing. In view of this rate of release of sweetener from the chewing gum within the first several minutes of chewing, chewing gum manufacturers have attempted to not only increase the intensity of the sweetener which is delivered initially upon chewing of the gum, but also to delay the sweetness release over a longer period of time and in particular for times of up to about 25 to 30 minutes.

The ability to achieve high intensity up-front sweetness has been achieved by using artificial intense sweeteners, such as saccharin salts, acesulfame-K and free aspartame in chewing gum formulations in amounts of about 0.05 to about 0.2% by weight of the formulation.

One problem relating to the use of saccharin salts and acesulfame-K is the bitterness/off-note taste associated with such products, whereas aspartame degrades in its free form in the presence of moisture in conventional chewing gums. Even at low levels of about 2 or more percent moisture, aspartame will be degraded upon storage thus rendering it unavailable when the chewing gum is to be utilized.

With regard to delayed release or longer lasting release in chewing gum formulations, various techniques have been employed in the art, such as encapsulation of the sweetener components and use of sweetener-enhancing compounds, such as thaumatin and monellin. PCT application WO88/08672 also discloses a chewing gum composition having a controlled long lasting sweetness release comprising a gum base and an effective amount of the sweetener sucralose. The chewing gum contains sucralose in an amount such that within the initial two minutes of chewing the sucralose releases from the gum at a rate less than about 8 sucrose equivalents per minute; and at about 10 minutes of chewing, the sucralose releases from said gum at a rate of about 3 sucrose equivalents per minute. The chewing gum, in addition, may also contain a fast release sweetener, or an additional amount of sucrose treated to act as a fast release sweetener. More particularly, the technology described in this publication relates to an initial slow release of sucralose from the chewing gum formulation with a continued sustained or delayed longer lasting sweetness release throughout chewing. The reference, however, is silent as to how delayed release is achieved.

It remains desirable, however, to prepare a low moisture chewing gum formulation which does not posses the instability problems associated with the use of aspartame and bitterness/off-note taste associated with saccharin salts and acesulfame-K, yet one which is capable of rapidly releasing the sweetener upon initial chewing of the formulation and is capable of extended sweetener release. This initial onset of sweetness should be performed in the absence of a concurrent bitterness associated with high intensity sweeteners. Such formulations may also employ sweetening components which are able to achieve a longer lasting sweetness in combination with this initial high intensity sweetness.

SUMMARY OF THE INVENTION

In accordance with the present invention, a low moisture chewing gum composition has been prepared which has an immediate high release with sustained release of the artificial sweetener sucralose which results in the sucralose being released from the gum at a rate of about 15 to about 50 sucrose equivalents per minute within the initial 30 seconds of chewing, and wherein at about five minutes of chewing, said sucralose is released from the chewing gum composition at a rate of more than 6 sucrose equivalents per minute. The chewing gum compositions used in the present invention include a gum base, and a bulking agent comprising at least one bulk sweetener and a viscous liquid. Optionally, a hygroscopic liquid in an amount ranging from about 0% to about 5% by weight of the chewing gum composition may be included. In addition, the chewing gum compositions of the invention are considered anhydrous formulations which have moisture contents below about 2% by weight of the final chewing gum composition. Only by use of low moisture chewing gum formulations which employ a bulking agent comprising at least one bulk sweetener and a viscous liquid are Applicants able to achieve a specific initial high sucralose release rate from the present formulations, together with a continued sustained released after the initial chewing of the formulation.

The present invention also includes a process for preparing the subject chewing gum formulations, wherein the sucralose component is added in the final chewing gum manufacturing step with a portion of the bulking agent. By employing such a procedure, the sucralose apparently becomes easily removable from the chewing gum compositions within the first 30 seconds of chewing, thus resulting in a high release of sweetener during this initial phase. More particularly, the process for preparing the present sucralose-sweetened chewing gum composition comprises softening a gum base and adding thereto a portion of the total amount to be added of a bulking agent comprising at least one bulk sweetener and a viscous liquid while mixing; adding to this mixture a pre-blend containing the sucralose admixed with the remaining amount of the bulking agent; continuing mixing until a homogeneous mixture is obtained; and recovering the final chewing gum composition.

The chewing gum compositions prepared according to the invention exhibit sufficient plasticity and softness and retain these qualities over time without the presence of additional amounts of water being added. Thus, the present compositions may be exposed to relatively low humidity conditions for extended periods of time that may range as long as one year. Flavor sensation, chewability and other properties of the gums, including film formation in the case of bubble gums, is not adversely affected by the practice of the present invention and results in the formation of chewing gum materials which have an initial high burst of sweetness coupled with long lasting sweetener release when the chewing gum formulations are chewed.

DESCRIPTION OF THE PREFERRED EMBODIMENTS

Figure 1:
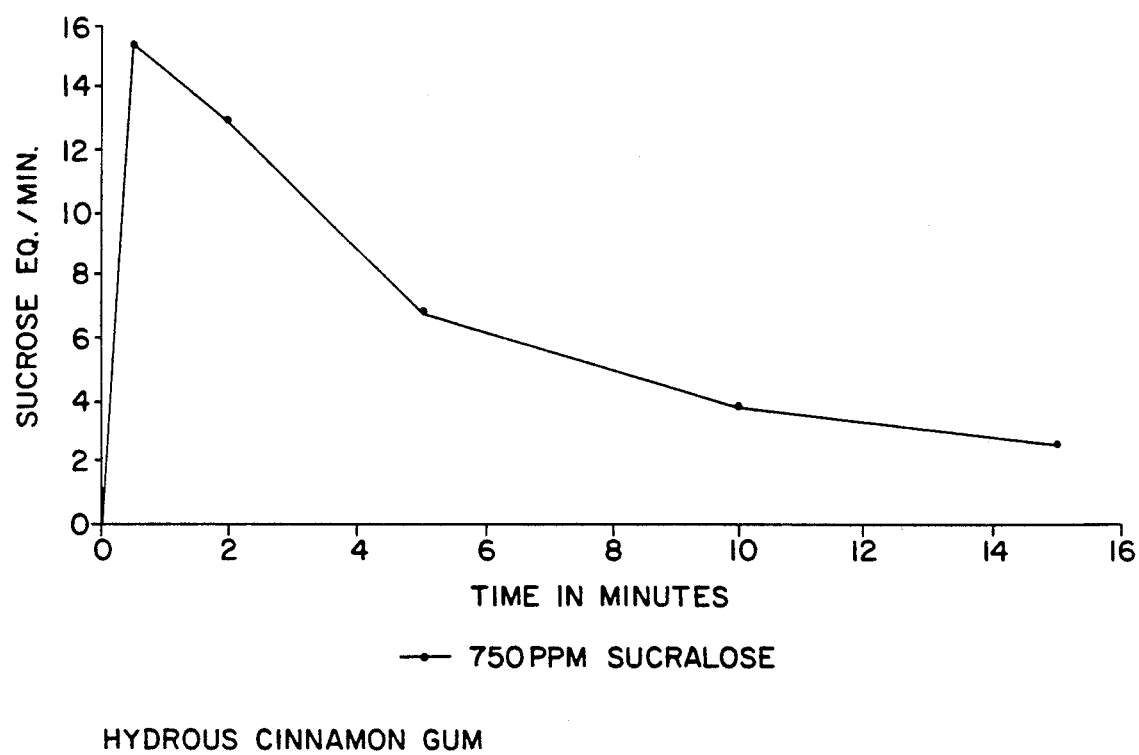
FIG. 1 depicts the release rate of sucralose from a low moisture chewing gum composition of the invention containing 750 ppm of sucralose.

The present invention relates to a low moisture sucralose sweetened chewing gum composition having a moisture content below about 2% by weight of the final chewing gum composition which composition exhibits a high release of the intense sweetener within the first 30 seconds of chewing and provides a sucralose release of more than 6 equivalents at 5 minutes of chewing. The chewing gum composition contains two essential components in addition to sucralose, the components being a chewing gum base, and a bulking agent comprising at least one bulk sweetener and a viscous liquid. The components are preferably employed in the composition such that the total moisture content of the final chewing gum composition is less than about 2% by weight and preferably more than about 1% by weight. Such formulations are considered to be hydrous formulations according to the invention and have been unexpectedly found to provide an initial high release of the intense sweetener sucralose followed by a sustained release of sucralose at a rate of more than 6 sucrose equivalents per minute at 5 minutes of chewing. Hydrous chewing gum formulations are distinguishable from anhydrous chewing gum compositions in that water-containing components such as corn syrup may be added to hydrous chewing gums, whereas anhydrous chewing gums are characterized by the presence of non-water-containing materials such as glycerin. Thus, low moisture chewing gum formulations as provided by the invention are said to be hydrous, even though the amount of water in the compositions is less than 2%, since water-containing components are employed and the amount of water in the compositions is not controlled.

With regard to the chewing gum composition, the amount of gum base employed will vary greatly depending on various factors such as the type of base used, consistency desired and other components used to make the final product. In general, amounts of about 5% to about 85% by weight of the final chewing gum composition are acceptable for use in the chewing gum compositions, with more preferred amounts being from about 5% to about 75%, and about 10% to about 55% by weight of the chewing gum composition. The most preferred amounts of gum base used in non-high base gums will generally be in the range of about 15% to about 25% by weight.

The gum base may be any water-insoluble gum base well known in the art. Illustrative examples of suitable polymers in gum bases include both natural and synthetic elastomers and rubbers which include, without limitation, substances of vegetable origin such as chicle, jelutong, qutta percha and crown gum, synthetic elastomers such as butadienestyrene copolymers, isobutylene-isoprene copolymers, polyethylene, polyisobutylene and polyvinylacetate and mixtures thereof.

The gum base composition may contain elastomer solvents to aid in softening the rubber component. Such elastomer solvents may comprise methyl, glycerol or pentaerythritol esters of rosins or modified rosins, such as hydrogenated, dimerized or polymerized rosins or mixtures thereof. Examples of elastomer solvents suitable for use herein include the pentaerythritol ester of partially hydrogenated wood rosin, pentaerythritol ester of wood rosin, glycerol ester of wood rosin, glycerol ester of partially dimerized rosin, glycerol ester of polymerized rosin, glycerol ester of tall oil rosin, glycerol ester of wood rosin and partially hydrogenated wood rosin and partially hydrogenated methyl ester of rosin, such as polymers of alpha-pinene or beta-pinene; terpene resins including polyterpene and mixtures thereof. The solvent may be employed in an amount ranging from about 10% to about 75% and preferably about 45% to about 70% by weight of the gum base.

A variety of traditional ingredients may be incorporated into the gum base such as plasticizers or softeners. Examples of these ingredients include lanolin, stearic acid, sodium stearate, potassium stearate, glycerol triacetate and the like. Natural waxes, petroleum waxes, polyurethane waxes, paraffin waxes and microcrystalline waxes may also be incorporated into the gum base to obtain a variety of desirable textures and consistency properties. Mixtures of these traditional ingredients are contemplated. These individual additional materials are generally employed in amounts of up to about 30% by weight and preferably in the amounts of from about 3% to about 20% by weight of the final gum base composition.

The low moisture chewing gum compositions of the invention include a bulking agent comprising at least one bulk sweetener and a viscous liquid. Useful bulk sweeteners include those well-known in the confectionery art, including natural sweeteners selected from the group consisting of sugar, monosaccharides, disaccharides, polysaccharides, xylose, ribose, glucose, mannose, galactose, fructose, dextrose, maltose, partially hydrogenated starch, corn syrup solids, and mixtures thereof.

The bulk sweeteners employed in the chewing gum formulations of this invention may also comprise one or more sugar alcohols well known in the art. Useful sugar alcohols include sorbitol, xylitol, mannitol, maltitol, and the like, which function as bulking agents and non-sugar sweeteners, particularly in the instance of sugar-free gum compositions.

Suitable viscous liquids for use in the formulations of the invention include corn syrup, fructose syrup, and similar materials known to those skilled in the art. Mixtures of these liquids may also be employed in the compositions of the invention.

Applicants have unexpectedly discovered that the low moisture chewing gum formulations of the invention which contain this bulk sweetener/viscous liquid bulking agent are capable of providing a high rate of release of sucralose during the early stage of chewing, followed by a sustained release of sucralose at a later stage of chewing. Specifically, the low moisture chewing gum formulations of the invention have been found to provide a sucralose rate of release of 15 to 50 sucrose equivalents within the initial 30 seconds of chewing, and a rate of more than 6 sucrose equivalents at about 5 minutes of chewing.

The low moisture bulking agent is prepared such that the final chewing gum composition will have a moisture content of less than 2% by weight, and preferably more than 1% by weight of the total composition. Greater amounts of water in the chewing gums of the invention are acceptable, although not preferred. A preferred bulking agent for use with the invention comprises a mixture of sugar and corn syrup, in a ratio by weight of corn syrup to sugar ranging from about 1:3 to about 1:6.

In accordance with the formulations of the present invention, water is generally present in amounts of less than 2% and preferably more than 1% by weight of the total chewing gum composition. Hygroscopic liquids may be optionally added in amounts ranging from about 0% to about 5% by weight of the total composition if necessary to impart the desired degree of moisture to the chewing gum compositions of the invention. Glycerin and 1,2 propanediol are the preferred hygroscopic liquids which are also preferably provided in anhydrous form. 5 Anhydrous glycerin is available as a syrupy liquid with a sweet warm taste, that offers a sweetness of about 60% that of cane sugar.

In a preferred embodiment of the present invention, a reduced calorie chewing gum composition is prepared that comprises a gum base in an amount ranging from about 10% to about 55% by weight, flavor in an amount ranging from about 0.6% to about 1 5% by weight, and the balance comprising a bulking agent comprising at least one bulk sweetener and a viscous liquid. The gum composition is a hydrous mixture of the above ingredients, and preferably contains less than about 2% by weight water in any form.

Sucralose is employed in the invention as the primary artificial sweetener. The particle size of the sucralose is critical to prepare a formulation which exhibits high upfront sweetness release It has been unexpectedly discovered that sucralose particle sizes, wherein 90% are less than 37 microns and wherein 50% are less than 10.7 microns in size, result in acceptable sweetener release. Larger particles cause the sucralose to be retained in the formulation and form delayed, i.e., sustained, longer sweetener release products rather than products having upfront sweetness.

The low moisture chewing gums of the invention when chewed result in the sucralose being released into the oral cavity at a rate of about 15 to 50 sucrose equivalents per minute within the first 30 seconds of chewing resulting in a rapid onset of sweetener perception. As chewing continues, the sucralose level drops gradually and results in a release rate of more than 6 sucrose equivalents per minute at 5 minutes of chewing. This level of release causes a continuing sweetener release at a reduced, yet consistent, level. The term sucrose equivalent as used herein refers to the amount of sweetener release times 600 (the sweetener level of sucralose over sucrose). This level of sweetness release is achieved by employing from about 0.05% to about 0.5% by weight sucralose and preferably from about 0.1% to about 0.4% by weight sucralose. This release rate is depicted in FIG. 1 using a low moisture chewing gum formulation containing 750 ppm sucralose.

The chewing gum compositions prepared according to this invention are perceived as having an excellent initial sweetness level while leaving the flavor components basically unaffected and contributing nothing to bitterness. With regard to this latter feature, other intense sweeteners affect the bitterness character of the gum product by exhibiting such property when used in high amounts.

While the invention is directed to the immediate release of a high intensity sweetener within the first 30 seconds of 5 chewing, and subsequent slower release at reduced levels, the addition of optional sweeteners to prepare a longer lasting, greater intense sweetener release rate is also contemplated.

In the instances where auxiliary sweeteners are utilized in addition to sucralose, the present invention contemplates the inclusion of those sweeteners well known in the art, including both natural and artificial sweeteners. Thus, additional sweeteners may be chosen from the following non-limiting list: sugars such as sucrose, glucose (corn syrup), dextrose, invert sugar, fructose, and mixtures thereof; saccharin and its various salts such as the sodium or calcium salt; cyclamic acid and its various salts such as the sodium salt; the dipeptide sweeteners such as aspartame; dihydrochalcone compounds; glycyrrhizin; Stevia Rebaudiana (Stevioside); alitame; talin; and the like. Also contemplated as an additional sweetener is the nonfermentable sugar substitute (hydrogenated starch hydrolysate) which is described in U.S. Reissue Pat. No. 26,959. Also contemplated is the synthetic sweetener 3,6-dihydro-6-methyl-1-1,2,3-oxathiazin-4-one-2,2-dioxide, particularly the potassium (Acesulfame-K), sodium and calcium salts thereof as described in German Pat. No. 2,001,017 7. Other sweeteners and mixtures of sweeteners are contemplated.

When the additional optional sweeteners are used they may be employed in amounts necessary to impart long lasting sweetness and are preferably employed in amounts of about 0.001 to about 50% by weight. Aspartame, acesulfame-K, saccharin and its salts are the preferred tertiary sweeteners and are used in amounts of about 0.01% to about 2.5% and preferably about 0.05% to 1.0% respectively, by weight. The other auxiliary sweeteners may be used in conventional amounts based on the total weight of the chewing gum composition, as standard in the art.

One or more of the sweeteners may be in encapsulated form prior to incorporation in the chewing gum composition, thus delaying the release of the sweetener and lengthening the perceptible sweetness and/or staggering their release. Thus, the sweeteners may be incorporated such that they release sequentially.

In addition to the ingredients listed above, the gum compositions may also include a wide variety of adjuvant materials, such as plasticizers, softeners, fillers, thickeners, and, of course, various flavors.

Useful plasticizers or softeners include lanolin, propylene glycol, and the like, and mixtures thereof. These components are included optionally to achieve desired texture and consistency of the final gum composition.

Fillers such as calcium carbonate, magnesium carbonate talc, and the like, as well as mineral adjuvants may be further included in the overall gum composition to provide body to the product.

The gum compositions may also contain thickeners, that may be employed alone or in conjunction with other softeners. The thickeners may include methylcellulose, alginates, carrageenan, xanthan gum, gelatin, tragacanth, locust bean, and carboxymethylcellulose.

The gum compositions may contain a variety of flavors along or in admixture with each other, depending upon the type of gum it is desired to prepare. Particularly, flavors useful in the present invention include essential oils, such as cinnamon, spearmint, peppermint, birch, anise and the like; natural fruit flavors derived from the essence of fruits, such as apple, pear, peach, strawberry, cherry, apricot, orange, watermelon, banana and the like; bean-derived flavors, such as coffee, cocoa and the like; wine-derived flavors, such as curacao, zin and the like; and pungent materials, such as affinin, pepper, mustard and the like. The flavor component is added in a range of from about 0.3% to about 2.5% by weight of the entire gum composition.

The present method includes a method for preparing a gum composition, including both chewing gum and bubble gum formulations, comprising preparing a pre-blend of a portion of the bulking agent with the sucralose in powdered form. Preferably, the pre-blend formulation contains about 10% by weight of the total bulking agent used in the chewing gum composition. As described in U.S. Pat. No. 4,514,422, the gum base, a sugar alcohol and glycerin may be optionally dried and added to the hydrous formulations of the invention. This is not a critical embodiment and is an optional embodiment. An illustrative process involves first melting the gum base at a temperature from 70 to 120° C. and mixing the gum base in a kettle with a liquid softener and/or an emulsifier for 2 to 8 minutes. To this mixture, two-thirds to three-fourths of the bulking agent ingredient and color additives are added and mixing is continued for an additional 1 to 4 minutes. Glycerin or 1,2 propanediol, if desired, is then added to the formulation and mixed for an additional 1 to 5 minutes, followed by addition of the flavoring agent, wherein mixing is continued until a homogeneous mixture is prepared. To this mixture is added the pre-blend containing the remaining bulking agent and sucralose. Mixing is maintained for 1 to 4 minutes. The gum is then discharged from the kettle and formed into its desired shape, such as strips, slabs, chunks, balls, ropes and/or center filled. By adding the sucralose through the bulking agent in the final step of the process of the invention, the sucralose is able to be released immediately upon chewing the chewing gum formulations of the invention.

The following examples are given to illustrate the invention, but are not deemed to be limiting thereof. All percentages given throughout the specification are based on weight, unless otherwise indicated, percentages of base components are by weight of the base, whereas chewing gum composition components are by weight of the final chewing gum formulation.

EXAMPLE 1

This example illustrates the preparation of a low moisture sucralose sweetened chewing gum according to the invention.

Chewing gum pieces were made using the inventive formulation set forth in Table I, and the preferred process described above.

The freshly made gum pieces were then subjected to a chewout panel study in order to determine the amount of sucrose equivalent sweetness provided by the gum over time. Each panelist was given a piece of gum and requested to chew the gum for a predetermined period of time, at which point the gum was removed and analyzed to determine the amount of sucralose that had been chewed out of the gum during the tested chewing period. From this information, the amount of sucrose equivalent sweetness provided by the gum during the chew was calculated. This procedure was carried out for chewing periods of 30 seconds, 2 minutes, 5 minutes, 10 minutes and 15 minutes.

The results are shown in FIG. 1. As illustrated therein, the chewing gum formulations of the invention were judged to be capable of immediately releasing sucralose at high intensities, such that a sucralose release rate between about 15 and 50 sucrose equivalents per minute was achieved within an initial 30 seconds of chewing. In addition, at about 5 minutes, the sucralose was released from the chewing gum composition at a rate of more than 6 sucrose equivalents per minute.

TABLE I

| Ingredients | Amount (wt. %) |
| --- | --- |
| Gum Base | 28.0710 |
| Corn Syrup | 12.3549 |
| Sugar | 57.0208 |
| Softener | 0.7904 |
| Liquid Flavor | 1.5698 |
| Color | 0.1181 |
| Sucralose | 0.0750 |
| | 100.0000 |

EXAMPLE 2

The procedure of Example 1 was repeated using the chewing gum formulation set forth in Table II, and the preferred process described above.

Figure 2:
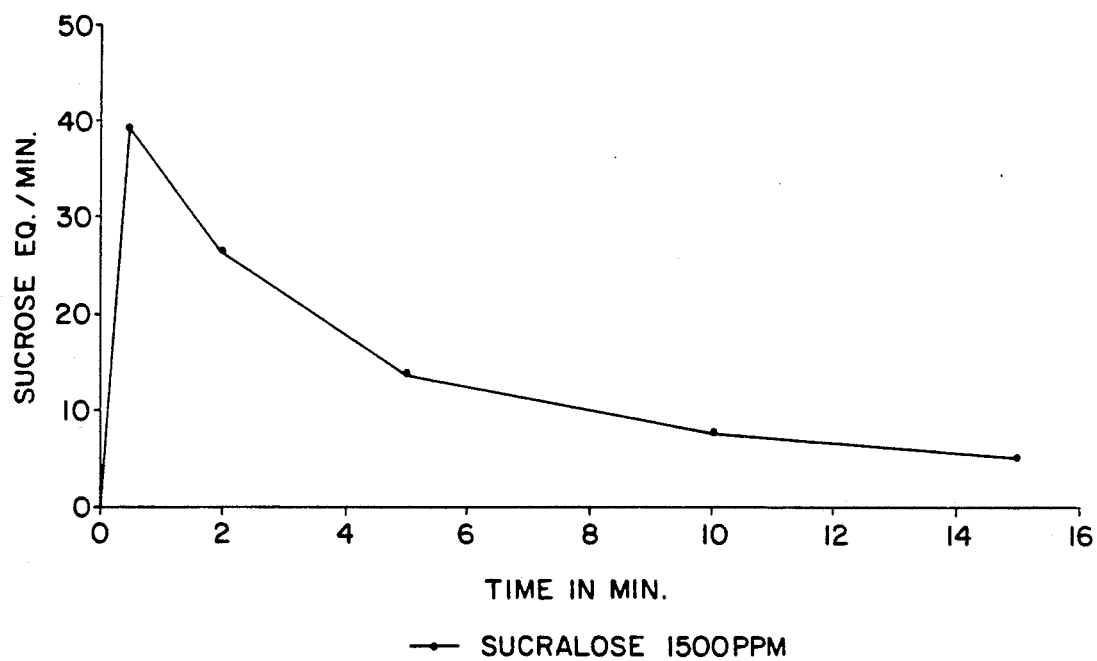
FIG. 2 depicts the release rate of sucralose from a low moisture chewing gum composition of the invention containing 1500 ppm of sucralose.

The freshly prepared chewing gum pieces were then subjected to a second chewout panel study following the procedure described in Example 1. The results are shown in FIG. 2. Again, the chewing gum formulations of the invention were judged to be capable of immediately releasing sucralose at high intensities, such that a sucralose release rate between about 15 and 50 sucrose equivalents per minute was achieved within an initial 30 seconds of chewing. At about 5 minutes, the sucralose was still being released from the chewing gum composition at a rate of more than 6 sucrose equivalents per minute.

In addition, based on the results of Examples 1 and 2, it is evident that the amount of sucralose released by the tested gums increased with concentration of sucralose utilized in the formulation. The effect on sucralose release of adding free sucralose to the gum clearly depends on the concentration level already present.

TABLE II

| Ingredients | Amount (wt. %) |
| --- | --- |
| Gum Base | 28.0710 |
| Corn Syrup | 12.3549 |
| Sugar | 56.9458 |
| Softener | 0.7904 |
| Liquid Flavor | 1.5698 |
| Color | 0.1181 |
| Sucralose | 0.1500 |
| | 100.0000 |

The invention thus being described, it will be obvious that the same may be varied in many ways. Such variations are not to be regarded as a departure from the spirit and scope of the invention and all such modifications are intended to be included within the scope of the claims.

What is claimed is:

1. A low moisture sucralose sweetened chewing gum composition having a moisture content below about 2% by weight of the final composition, which comprises:
   a chewing gum base present in an amount of from about 5% to about 85%, by weight, sucralose in an amount of from about 0.05% to about 0.5% by weight and a bulking agent comprising at least one bulk sweetener and a viscous liquid, comprising corn syrup, fructose syrup and mixtures thereof, wherein said sucralose releases from said gum composition at a rate of 15 to 50 sucrose equivalents per minute within the initial 30 seconds of chewing said chewing gum composition and at a rate of more than 6 sucrose equivalents per minute at about 5 minutes of chewing.

2. The chewing gum composition of claim 1, wherein the gum base is present in an amount of about 5% to about 75% by weight of the chewing gum composition.

3. The chewing gum composition of claim 2, wherein the gum base is present in an amount of about 10% to about 55% by weight of the final composition.

4. The chewing gum composition of claim 1, wherein said bulk sweetener comprises a natural sweetener selected from the group consisting of sugar, monosaccharides, disaccharides, polysaccharides, xylose, ribose, glucose, mannose, galactose, fructose, dextrose, maltose, partially hydrogenated starch, corn syrup solids, and mixtures thereof.

5. The chewing gum composition of claim 1, wherein said bulk sweetener comprises a sugar alcohol selected from the group consisting of sorbitol, xylitol, mannitol, maltitol and mixtures thereof.

6. The chewing gum composition of claim 1, wherein said bulk sweetener comprises sugar and said viscous liquid comprises corn syrup.

7. The chewing gum composition of claim 6, wherein the ratio of corn syrup to sugar in said bulking agent is from about 1:3 to about 1:6 parts by weight of said bulking agent.

8. The chewing gum composition of claim 1, further comprising a hygroscopic liquid selected from the group consisting of glycerin and 1,2 propanediol.

9. The chewing gum composition of claim 8, wherein said hygroscopic liquid is present in an amount of from about 0% to about 5% by weight of said chewing gum composition.

10. The chewing gum composition of claim 1, wherein said gum base is selected from the group consisting of natural and synthetic elastomers.

11. The chewing gum composition of claim 1, wherein an additional sweetener is added to the composition which is a natural or synthetic compound.

12. The chewing gum composition of claim 14, wherein said additional sweetener is selected from the group consisting of water-soluble sweetening agents, water-soluble artificial sweeteners, dipeptide based sweeteners and mixtures thereof.

13. The chewing gum composition of claim 1, containing one or more additional components selected from the group consisting of fillers, plasticizers, softeners, coloring agents, flavors and mixtures thereof.

14. A process for preparing a low moisture sucralose sweetened chewing gum composition having a moisture content below about 2% by weight of the final composition, which comprises:

softening a gum base in an amount of from about 5% to 85% by weight of the chewing gum composition and adding thereto a portion of the total amount to be added of a bulking agent comprising at least one bulk sweetener and viscous liquid consisting of corn syrup, fructose syrup, and mixtures thereof, while mixing the ingredients; adding to this mixture a pre-blend containing the sucralose in an amount of from about 0.05% to 0.5% by weight admixed with the remaining amount of bulking agent while mixing; continuing mixing until a homogeneous mixture is obtained; and removing the composition, and wherein the sucralose is released from said composition at a rate of 15 to 50 sucrose equivalents per minute within the initial 30 seconds of chewing said chewing gum composition and at a rate of more than 6 sucrose equivalents per minute at about 5 minutes of chewing.

15. The process of claim 14, wherein the gum base is present in an amount of about 5% to about 75% by weight of the chewing gum composition.

16. The process of claim 15, wherein said gum base is present in an amount of about 10% to about 55% by weight of the chewing gum composition.

17. The process of claim 14, wherein said bulk sweetener comprises a natural sweetener selected from the group consisting of sugar, monosaccharides, disaccharides, polysaccharides, xylose, ribose, glucose, mannose, galactose, fructose, dextrose, maltose, partially hydrogenated starch, corn syrup solids, and mixtures thereof.

18. The process of claim 14, wherein said bulk sweetener comprises a sugar alcohol selected from the group consisting of sorbitol, xylitol, mannitol, maltitol and mixtures thereof.

19. The process of claim 14, wherein said bulk sweetener comprises sugar and said viscous liquid comprises corn syrup.

20. The process of claim 19, wherein the ratio of corn syrup to sugar in said bulking agent is from about 1:3 to about 1:6 parts by weight of said bulking agent.

21. The process of claim 14, wherein a hygroscopic liquid selected from the group consisting of glycerin and 1,2 propanediol is added to said chewing gum composition prior to said pre-blend containing sucralose.

22. The process of claim 21, wherein said hygroscopic liquid is added in an amount of from about 0% to about 5% by weight of said chewing gum composition.

23. The process of claim 14, wherein said gum base is selected from the group consisting of natural and synthetic elastomers.

24. The process of claim 14, wherein an additional sweetener is added to the composition which is a natural or synthetic compound.

25. The process of claim 14, wherein said additional sweetener is selected from the group consisting of water-soluble sweetening agents, water-soluble artificial sweeteners, dipeptide based sweeteners and mixtures thereof.

26. The process of claim 14, containing one or more additional components selected from the group consisting of fillers, plasticizers, softeners, coloring agents, flavors and mixtures thereof.

* * * * *

UNITED STATES PATENT AND TRADEMARK OFFICE
CERTIFICATE OF CORRECTION

PATENT NO. : 5,082,671

DATED : January 21, 1992

INVENTOR(S) : Subraman Rao Cherukuri, Krishna Raman, Steven M. Faust

It is certified that error appears in the above-identified patent and that said Letters Patent is hereby corrected as shown below:

On the title page, item (75) inventors, should read--

Subraman R. Cherukuri, Krishna Raman and
        Steven M. Faust        --.

Signed and Sealed this

Seventh Day of September, 1993

Attest:

BRUCE LEHMAN

*Attesting Officer*      *Commissioner of Patents and Trademarks*